(12) United States Patent
Corona

(10) Patent No.: US 9,896,136 B2
(45) Date of Patent: Feb. 20, 2018

(54) TRUCK RACK SYSTEM

(71) Applicant: William Corona, Oxnard, CA (US)

(72) Inventor: William Corona, Oxnard, CA (US)

( * ) Notice: Subject to any disclaimer, the term of this patent is extended or adjusted under 35 U.S.C. 154(b) by 0 days.

(21) Appl. No.: 15/185,957

(22) Filed: Jun. 17, 2016

(65) Prior Publication Data
US 2017/0361877 A1  Dec. 21, 2017

(51) Int. Cl.
*B62D 33/02* (2006.01)

(52) U.S. Cl.
CPC ................................ *B62D 33/0207* (2013.01)

(58) Field of Classification Search
CPC ....... B62D 33/0207; B60R 9/00; B60R 19/48; B60R 9/0423; B60R 9/06
USPC ............ 296/3, 57.1; 224/282, 402, 403, 405
See application file for complete search history.

(56) References Cited

U.S. PATENT DOCUMENTS

| | | | |
|---|---|---|---|
| 3,891,262 A * | 6/1975 | Brunel | B60P 7/06 211/192 |
| 5,190,337 A * | 3/1993 | McDaniel | B60P 3/42 224/405 |
| 5,303,858 A | 4/1994 | Price | |
| 5,658,033 A | 8/1997 | Delaune | |
| 5,743,583 A | 4/1998 | Lowe | |
| 6,186,571 B1 * | 2/2001 | Burke | B60P 3/40 224/405 |
| 6,644,704 B1 * | 11/2003 | Nyberg | B60R 9/00 224/405 |
| 6,676,220 B2 * | 1/2004 | Mistler | B60P 1/28 298/1 A |
| 7,258,380 B1 * | 8/2007 | Aguilar | B60P 3/40 296/3 |
| 7,296,836 B1 * | 11/2007 | Sabo | B60R 9/00 296/3 |
| 7,494,169 B2 * | 2/2009 | Collins | B60P 3/40 296/3 |
| D597,924 S | 8/2009 | Smith | |
| 7,758,091 B1 | 7/2010 | McCall | |
| 8,113,562 B2 * | 2/2012 | Skoglun | B62D 33/02 224/405 |
| 8,777,288 B2 * | 7/2014 | Johnasen | B60P 3/00 224/324 |

* cited by examiner

*Primary Examiner* — Jason S Morrow
*Assistant Examiner* — E Turner Hicks

(57) ABSTRACT

A truck rack system includes a truck has a cab, a bed and a frame. The bed has a back end and a rack is hingedly coupled to the bed. The rack is positioned in an upright position having the rack is oriented perpendicular to the bed. Thus, the rack may support an object extending between the cab and the rack. The rack is positioned in a lowered position having the rack being oriented parallel to the bed and extending outwardly from the back end. Thus, the rack may support an object that is placed in the bed. The rack supports an object that has a length that is greater than a length of the bed.

12 Claims, 6 Drawing Sheets

TRUCK RACK SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIE THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to rack devices and more particularly pertains to a new rack device being hingedly coupled to a bed of a truck.

BRIEF SUMMARY OF THE INVENTION

An embodiment of the disclosure meets the needs presented above by generally comprising a truck has a cab, a bed and a frame. The bed has a back end and a rack is hingedly coupled to the bed. The rack is positioned in an upright position having the rack is oriented perpendicular to the bed. Thus, the rack may support an object extending between the cab and the rack. The rack is positioned in a lowered position having the rack being oriented parallel to the bed and extending outwardly from the back end. Thus, the rack may support an object that is placed in the bed. The rack supports an object that has a length that is greater than a length of the bed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
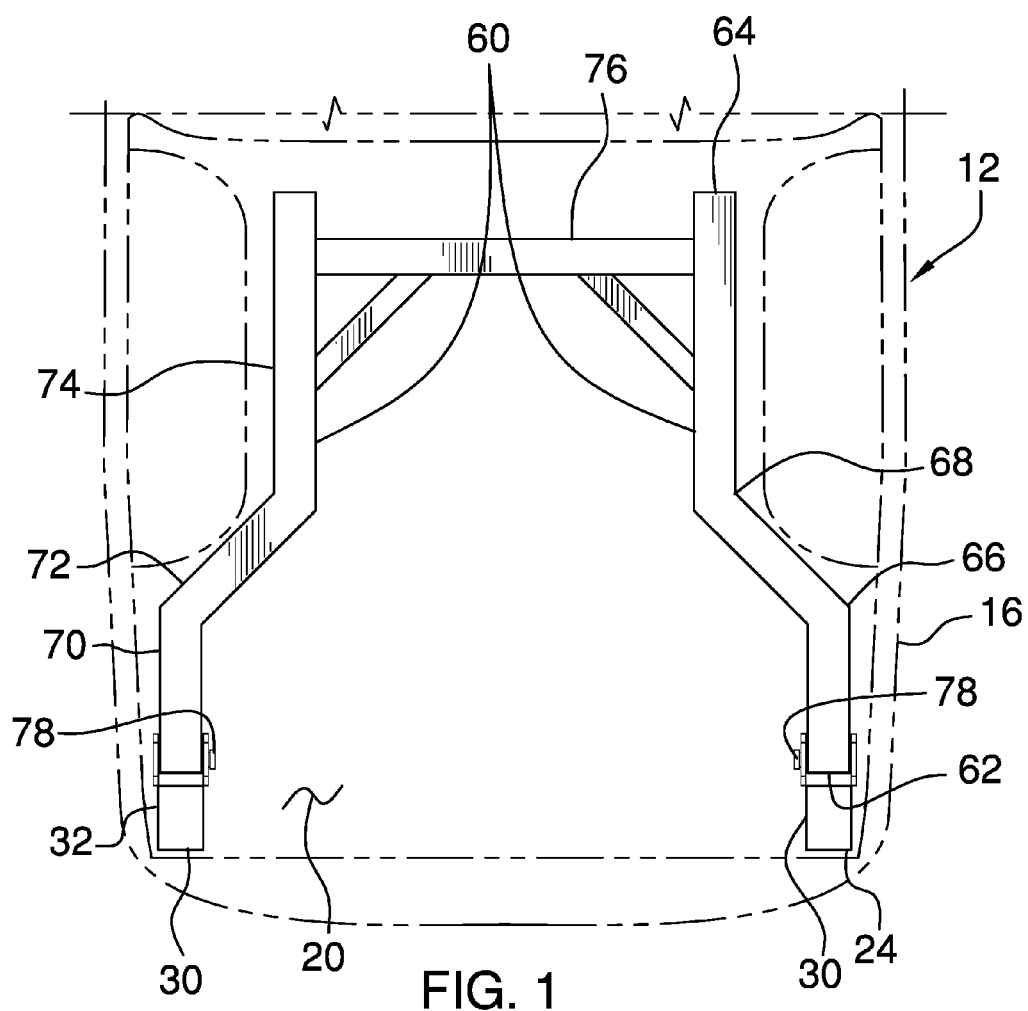
FIG. 1 is a top view of a truck rack system according to an embodiment of the disclosure.
Figure 2:
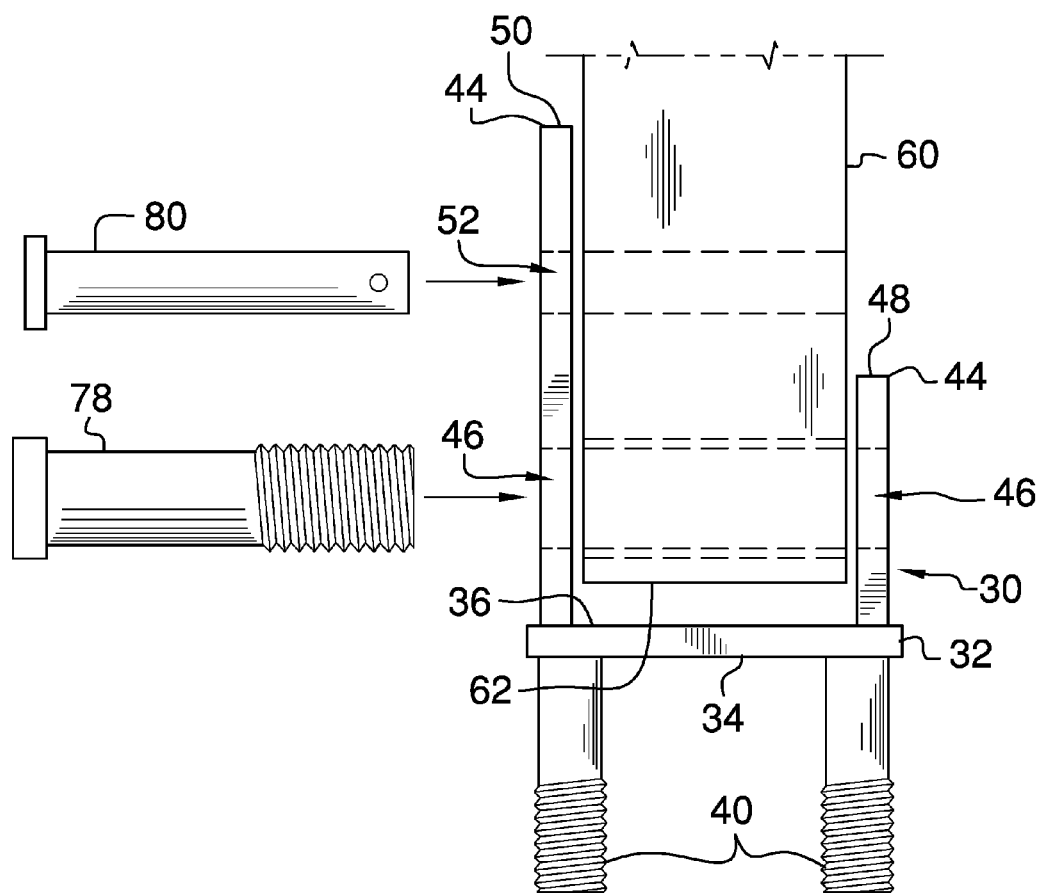
FIG. 2 is a back view of mount of an embodiment of the disclosure.
Figure 3:
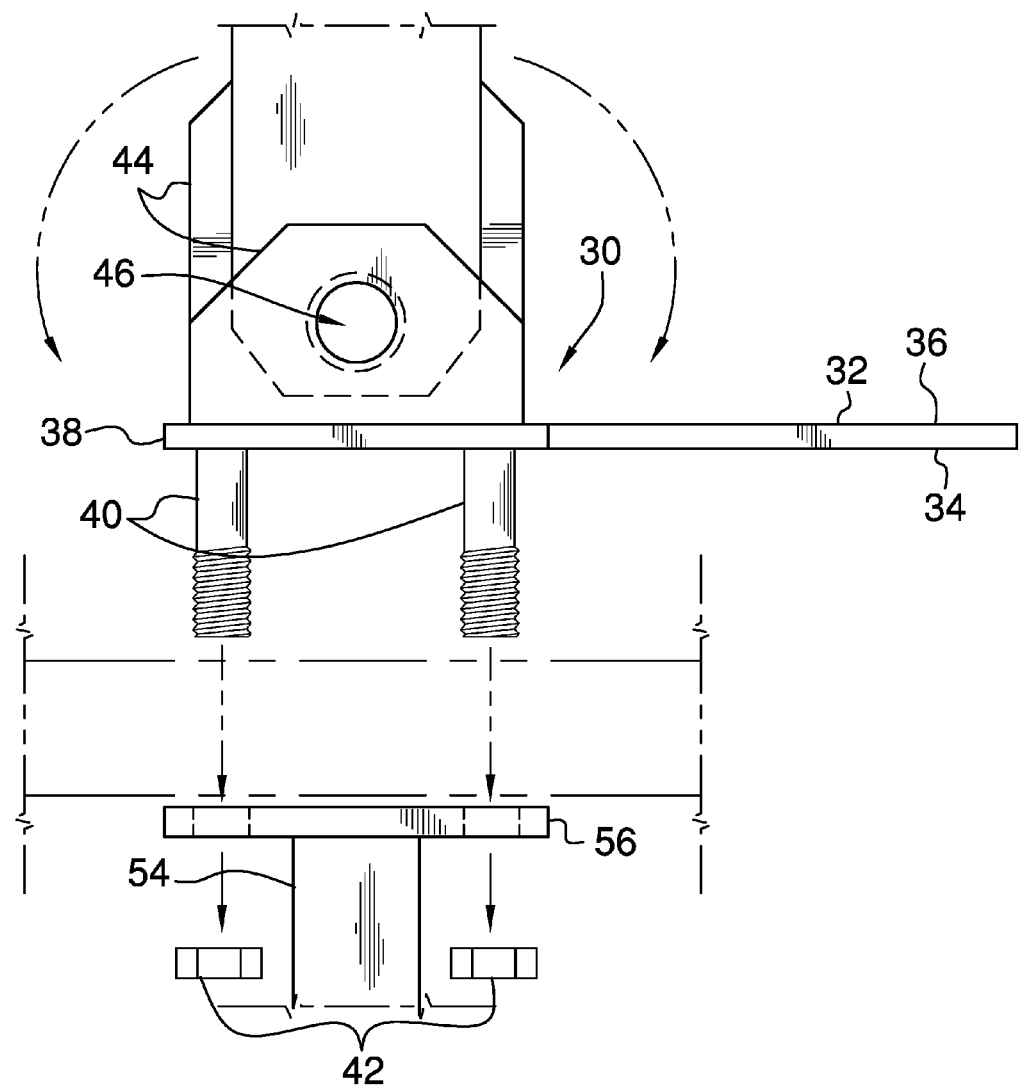
FIG. 3 is a right side view of mount of an embodiment of the disclosure.
Figure 4:
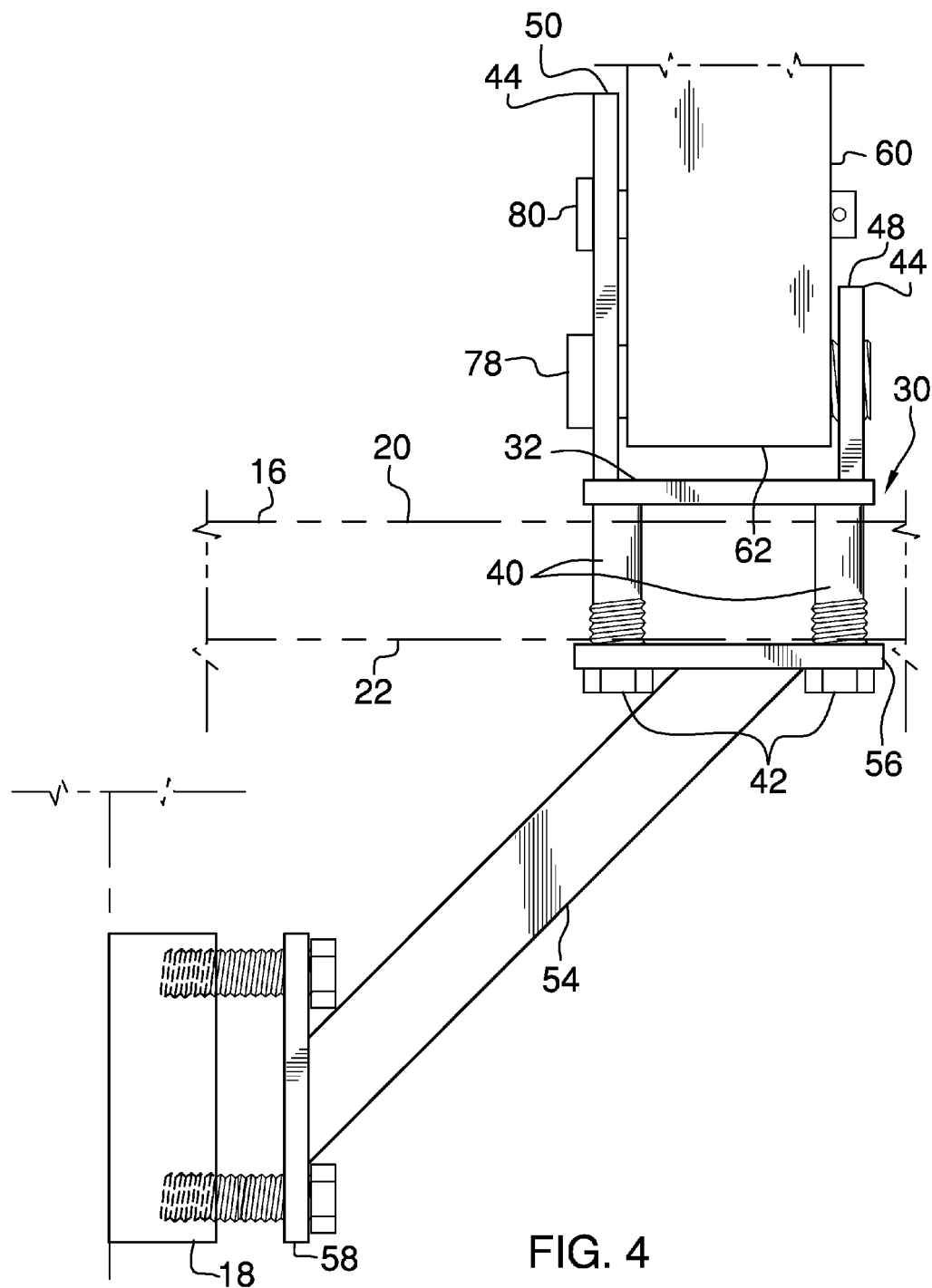
FIG. 4 is a back perspective view of an embodiment of the disclosure.
Figure 5:
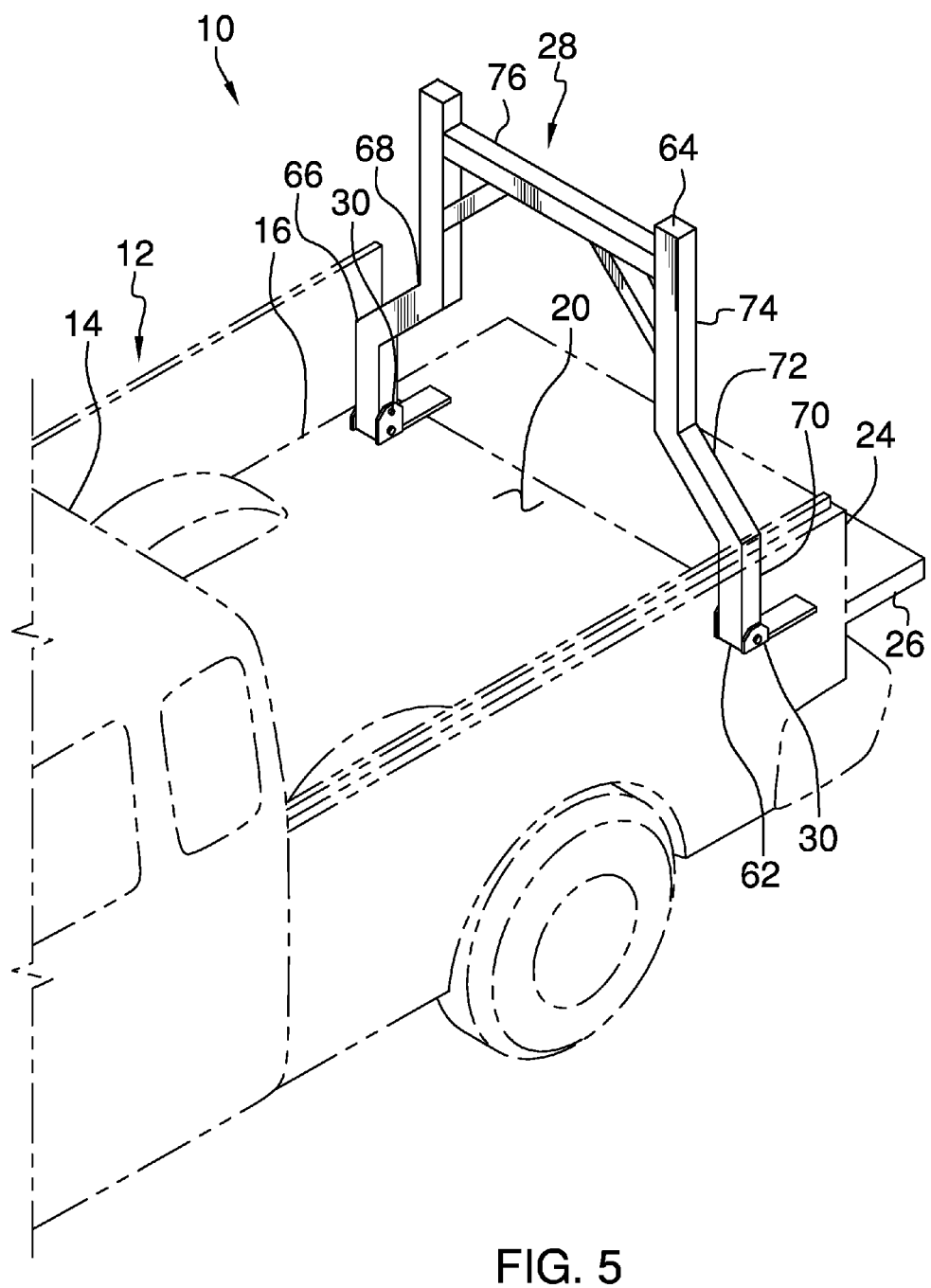
FIG. 5 is a perspective in-use view of an embodiment of the disclosure in an upright position.
Figure 6:
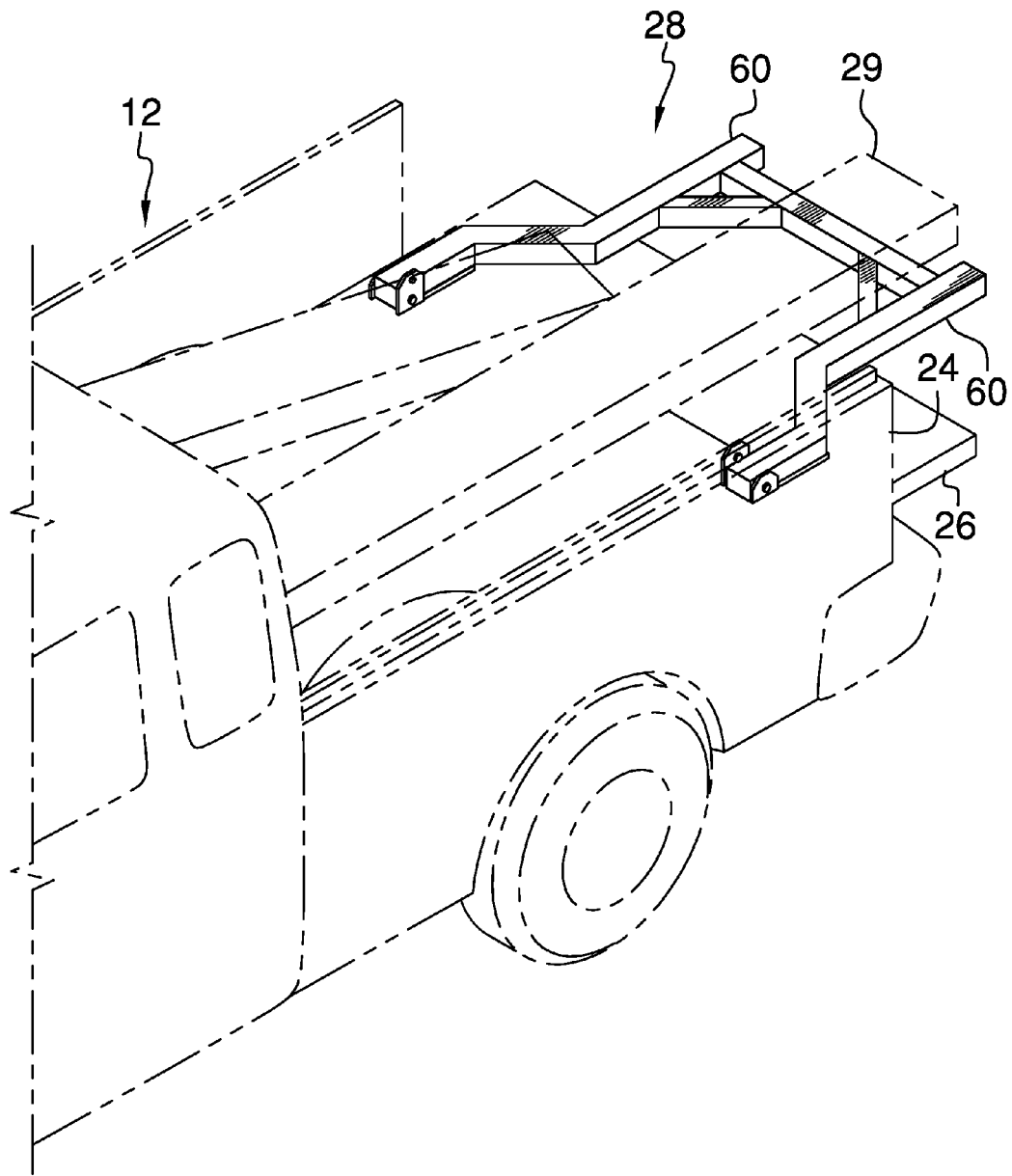
FIG. 6 is a perspective in-use view of an embodiment of the disclosure in a lowered position.

With reference now to the drawings, and in particular to FIGS. 1 through 6 thereof, a new rack device embodying the principles and concepts of an embodiment of the disclosure and generally designated by the reference numeral 10 will be described.

As best illustrated in FIGS. 1 through 6, the truck rack system 10 generally comprises a truck 12 that has a cab 14, a bed 16 and a frame 18. The bed 16 has an upper surface 20, a lower surface 22 and a back end 24. The back end 24 is open and a tailgate 26 may be hingedly coupled to the back end 24. The tailgate 26 may be selectively positioned in an open position and a closed position. The truck 12 may comprise a pickup or the like.

A rack 28 is provided and the rack 28 is hingedly coupled to the bed. The rack 28 is positioned in an upright position having the rack 28 being oriented perpendicular to the bed. Thus, the rack 28 may support an object 29 extending between the cab and the rack 28. The rack 28 is positioned in a lowered position having the rack 28 being oriented parallel to the bed 16 and extending outwardly from the back end 24. Thus, the rack 28 may support an object 29 that has a length that is greater than a length of the bed 16.

The rack 28 comprises a pair of mounts 30. Each of the mounts 30 is coupled to the upper surface of the bed 16. The mounts 30 are spaced apart from each other. Each of the mounts 30 is aligned with the back end 24 of the bed 16.

Each of the mounts 30 comprises a plate 32 that has a first surface 34, a second surface 36 and a first end 38. The first surface 34 is coupled to the bed 16 having the first end 38 being directed toward the cab 14.

A pair of first bolts 40 is provided. Each of the first bolts 40 is coupled to and extends downwardly from the first surface 34 of the plate 32. Each of the first bolts 40 extends downwardly through the bed 16. A pair of first nuts 42 is provided. Each of the first nuts 42 engages an associated one of the first bolts 40 such that the plate 32 is retained on the bed 16.

A pair of panels 44 is provided. Each of the panels 44 is coupled to and extends upwardly from the second surface 36. The panels 44 are spaced apart from each other. Each of the panels 44 has a first aperture 46 extending therethrough. The first aperture 46 in each of the panels 44 is aligned with each other.

The pair of panels 44 includes a first panel 48 and a second panel 50. The first panel 48 has a height that is greater than a height of the second panel 50. The first panel 48 has a second aperture 52 extending therethrough. The second aperture 52 is positioned above the first aperture 46 corresponding to the second panel 50.

A strut 54 is provided and the strut 54 has a primary end 56 and a secondary end 58. Each of the first bolts 40 engages the primary end 56 of the strut 54. Thus, the strut 54 is coupled to the lower surface 22 of the bed 16. The secondary end 58 is coupled to the frame 18 such that the strut 54 reinforces the plate 32 with respect to the bed 16.

The rack 28 includes a pair of uprights 60 and each of the uprights 60 has a first end 62 and a second end 64. Each of the uprights 60 has a first bend 66 spaced from a second bend 68. The first bend 66 and the second bend 68 define a lower portion 70, a middle portion 72 and an upper portion 74 corresponding to each of the uprights 60. An angle between the middle portion 72 and the lower portion 70 is congruent with an angle between the middle portion 72 and the upper portion 74.

The first end 62 corresponding to each of the uprights 60 is positioned between the panels 44 of an associated one of the mounts 30. Each of the uprights 60 is oriented perpendicular to the upper surface of the bed when the rack 28 is in the upright position. Each of the uprights 60 lies on the upper surface 20 of the bed 16 when the rack 28 is in the lowered position. Additionally, the second end 64 is directed outwardly from the back end 24 of the bed 16 when the rack 28 is in the lowered position. Each of the uprights 60 lies on the plate 32 corresponding to each of the mounts 30. Thus, the rack 28 is retained being oriented parallel to the bed 16 when the rack 28 is in the lowered position.

The upper portion 74 corresponding to each of the uprights 60 is offset inwardly with respect to the lower portion 70 of the corresponding upright 60. The rack 28 is positioned in a stored position. Thus, the second end 64 corresponding to each of the uprights 60 is directed toward the cab 14. Each of the uprights 60 lies on the upper surface 20 of the bed 16 when the rack 28 is in the stored position.

A central member 76 is provided. The central member 76 extends between the upper portion 74 corresponding to each of the uprights 60. The central member 76 is spaced from the second end 64 corresponding to each of the uprights 60. The central member 76 may support the object extending between the cab and the rack 28 when the rack 28 is positioned in the upright position.

A pair of second bolts 78 is provided. Each of the second bolts 78 extends through the first apertures 46 in an associated one of the mounts 30 and an associated one of the uprights 60. Thus, the rack 28 is hingedly coupled to the mounts 30.

A pair of pins 80 is provided. Each of the pins 80 extends through the second aperture 52 in an associated one of the mounts 30 and an associated one of the uprights 60 when the rack 28 is positioned in the upright position. Thus, the rack 28 is retained in the upright position. Each of the pins 80 is removed from the associated mount and the associated upright when the rack 28 is positioned in the lowered position.

In use, the rack 28 is positioned in the upright position to support the object extending between the cab and the central member 76. Each of the pins 80 is extended through the associated second aperture 52 and the associated upright.

Thus, the rack 28 is retained in the upright position. Each of the pins 80 is removed from the associated second aperture 52 when the rack 28 is positioned in the lowered position. Each of the uprights 60 lies on the on the plate 32 corresponding to each of the mounts 30 when the rack 28 is in the lowered position. Moreover, the rack 28 extends outwardly through the back end of the bed. Thus, the rack 28 supports the object 29 that has a length that is greater than the length of the bed 16.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A truck rack system comprising:
   a truck having a cab, a bed and a frame, said bed having a back end, said bed having an upper surface, a lower surface, said back end being open, said bed including a tailgate being hingedly coupled to said back end, said tailgate being selectively positioned in an open position and a closed position; and
   a rack being hingedly coupled to said bed, said rack being positioned in an upright position having said rack being oriented perpendicular to said bed wherein said rack is configured to support an object extending between said cab and said rack, said rack being positioned in a lowered position; and
   said rack comprises a pair of mounts, each of said mounts being coupled to said upper surface of said bed, said mounts being spaced apart from each other, each of said mounts being aligned with said back end of said bed, each said mount including an elongated plate, said rack resting partially upon each said elongated plate in said lowered position such that said rack extends outwardly from said back end of said bed beyond a distal edge of said tailgate relative to said bed when said tailgate is open position.

2. The system according to claim 1, wherein each said plate has a first surface, a second surface and a first end, said first surface being coupled to said bed having said first end being directed toward said cab.

3. The system according to claim 2, further comprising:
   a pair of first bolts, each of said first bolts being coupled to and extending downwardly from said first surface of said plate, each of said first bolts extending through said bed; and a pair of first nuts, each of said first nuts engaging an associated one of said first bolts such that said plate is retained on said bed.

4. The system according to claim 2, further comprising a pair of panels, each of said panels being coupled to and extending upwardly from said second surface, said panels being spaced apart from each other, each of said panels having a first aperture extending therethrough, said first aperture in each of said panels being aligned with each other.

5. The system according to claim 4, wherein said pair of panels includes a first panel and a second panel, said first panel having a height being greater than a height of said second panel, said first panel having a second aperture extending therethrough, said second aperture being positioned above said first aperture corresponding to said second panel.

6. The system according to claim 3, further comprising a strut having a primary end and a secondary end, each of said first bolts engaging said primary end of said strut such that said strut is coupled to a lower surface of said bed, said secondary end being coupled to said frame such that said strut reinforces said plate with respect to said bed.

7. The system according to claim 1, wherein said rack comprises a pair of uprights, each of said uprights having a first end and a second end, each of said uprights having a first bend being spaced from a second bend to define a lower portion, a middle portion and an upper portion corresponding to each of said uprights, an angle between said middle portion and said lower portion being congruent with an angle between said middle portion and said upper portion.

8. The system according to claim 7, wherein:
said rack includes a pair of mounts, each of said mounts having a pair of panels; and
said first end corresponding to each of said uprights being positioned between said panels of an associated one of said mounts, each of said uprights being oriented perpendicular to said upper surface of said bed when said rack is in said upright position, each of said uprights lying on said upper surface of said bed having said second end being directed outwardly from said back end of said bed when said rack is in said lowered position.

9. The system according to claim 7, further comprising a central member extending between said upper portion corresponding to each of said uprights, said central member being spaced from said second end corresponding to each of said uprights, said central member being configured to support the object extending between said cab and said rack when said rack is positioned in said upright position.

10. The system according to claim 4, further comprising:
a pair of uprights; and
a pair of second bolts, each of said second bolts extending through said first apertures in an associated one of said mounts and an associated one of said uprights such that said rack is hingedly coupled to said mounts.

11. The system according to claim 5, further comprising:
a pair of uprights; and
a pair of pins, each of said pins extending through said second aperture in an associated one of said mounts and an associated one of said uprights when said rack is positioned in said upright position such that said rack is retained in said upright position, each of said pins being removed from said associated mount and said associated upright when said rack is positioned in said lowered position.

12. A truck rack system comprising:
a truck having a cab, a bed and a frame, said bed having an upper surface, a lower surface and a back end, said back end being open, said bed including a tailgate being hingedly coupled to said back end, said tailgate being selectively positioned in an open position and a closed position; and
a rack being hingedly coupled to said bed, said rack being positioned in an upright position having said rack being oriented perpendicular to said bed wherein said rack is configured to support an object extending between said cab and said rack, said rack being positioned in a lowered position having said rack being oriented parallel to said bed and extending outwardly from said back end wherein said rack is configured to support an object being placed in said bed thereby facilitating an object having a length being greater than a length of said bed to be supported during transportation, said rack comprising:
a pair of mounts, each of said mounts being coupled to said upper surface of said bed, said mounts being spaced apart from each other, each of said mounts being aligned with said back end of said bed, each of said mounts comprising:
an elongated plate, said rack resting partially upon each said elongated plate in said lowered position such that said rack extends outwardly from said back end of said bed beyond a distal edge of said tailgate relative to said bed when said tailgate is open position, each said elongated plate having a first surface, a second surface and a first end, said first surface being coupled to said bed having said first end being directed toward said cab,
a pair of first bolts, each of said first bolts being coupled to and extending downwardly from said first surface of said plate, each of said first bolts extending through said bed,
a pair of first nuts, each of said first nuts engaging an associated one of said first bolts such that said plate is retained on said bed,
a pair of panels, each of said panels being coupled to and extending upwardly from said second surface, said panels being spaced apart from each other, each of said panels having a first aperture extending therethrough, said first aperture in each of said panels being aligned with each other, said pair of panels including a first panel and a second panel, said first panel having a height being greater than a height of said second panel, said first panel having a second aperture extending therethrough, said second aperture being positioned above said first aperture corresponding to said second panel,
a strut having a primary end and a secondary end, each of said first bolts engaging said primary end of said strut such that said strut is coupled to said lower surface of said bed, said secondary end being coupled to said frame such that said strut reinforces said plate with respect to said bed;
a pair of uprights, each of said uprights having a first end and a second end, each of said uprights having a first bend being spaced from a second bend to define a lower portion, a middle portion and an upper portion corresponding to each of said uprights, an angle between said middle portion and said lower portion being congruent with an angle between said middle portion and said upper portion, said first end corresponding to each of said uprights being positioned between said panels of an associated one of said mounts, each of said uprights being oriented perpendicular to said upper surface of said bed when said rack is in said upright position, each of said uprights lying on said upper surface of said bed having said second end being directed outwardly from said back end of said bed when said rack is in said lowered position, a central member extending between said upper portion corresponding to each of said uprights, said central member being spaced from said second end corresponding to each of said uprights, said central member being configured to support the object extending between said cab and said rack when said rack is positioned in said upright position, a pair of second bolts, each of said second bolts extending through said first apertures in an associated one of said mounts and an associated one of said uprights such that said rack is hingedly coupled to said mounts, and a pair of pins, each of said pins extending through said second aperture in an associated one of said mounts and an associated one of said uprights when said rack is positioned in said upright position such that said rack is retained in said upright position, each of said pins being removed from said associated mount and said associated upright when said rack is positioned in said lowered position.

* * * * *